United States Patent
Groarke et al.

(10) Patent No.: US 10,891,622 B2
(45) Date of Patent: Jan. 12, 2021

(54) PROVIDING ONLINE CARDHOLDER AUTHENTICATION SERVICES ON-BEHALF-OF ISSUERS

(71) Applicant: MasterCard International Incorporated, Purchase, NY (US)

(72) Inventors: Peter J. Groarke, Dublin (IE); Brian John Piel, Ballwin, MO (US)

(73) Assignee: Mastercard International Incorporated, Purchase, NY (US)

(*) Notice: Subject to any disclaimer, the term of this patent is extended or adjusted under 35 U.S.C. 154(b) by 1185 days.

(21) Appl. No.: 14/926,397

(22) Filed: Oct. 29, 2015

(65) Prior Publication Data

US 2016/0140558 A1    May 19, 2016

Related U.S. Application Data

(60) Provisional application No. 62/079,211, filed on Nov. 13, 2014.

(51) Int. Cl.
*G06Q 20/40* (2012.01)
*G06F 16/23* (2019.01)
(Continued)

(52) U.S. Cl.
CPC ....... *G06Q 20/405* (2013.01); *G06F 16/2358* (2019.01); *G06Q 20/02* (2013.01); *G06Q 20/12* (2013.01); *G06Q 20/401* (2013.01)

(58) Field of Classification Search
CPC ........ G06Q 20/04; G06Q 20/12; G06Q 20/40; G06Q 20/405; G06Q 20/02; G06Q 20/401; G06F 16/2358
See application file for complete search history.

(56) References Cited

U.S. PATENT DOCUMENTS 7,991,701 B2  8/2011 Weller et al.
2002/0029337 A1* 3/2002 Sudia ................. G06Q 20/401
                                                  713/176
(Continued)

FOREIGN PATENT DOCUMENTS

AU    2014100003 A4 *  2/2014
JP    2004516534 A     6/2004
(Continued)

OTHER PUBLICATIONS

Hannan Xiao and Ying Zhang. A Purchase Protocol with Live Cardholder Authentication for Online Credit Card Payment. The Fourth International Conference on Information Assurance and Security. IEEE Computer Society. pp. 15-20. (Year: 2008).*

(Continued)

*Primary Examiner* — Virpi H Kanervo
(74) *Attorney, Agent, or Firm* — Buckley, Maschoff & Talwalkar LLC

(57) ABSTRACT

Methods and systems for providing cardholder authentication services on-behalf-of (OBO) issuers utilizing a payment card authorization network to bridge cardholder authentication and transaction authorization processes. In some embodiments, the process includes an OBO issuer service computer receiving an authentication message, storing the authentication message in a transaction database and then receiving a purchase transaction authorization request message from a payment network. The OBO issuer service computer then determines that an authentication value of the received purchase transaction authorization request message matches the authentication value of the stored authentication message, stores a record of the match, and transmits the purchase transaction authorization request to the payment network for purchase authorization processing.

16 Claims, 5 Drawing Sheets

(51) Int. Cl.
*G06Q 20/12* (2012.01)
*G06Q 20/02* (2012.01)

(56) References Cited

U.S. PATENT DOCUMENTS

| | | | |
|---|---|---|---|
| 2003/0042301 | A1 | 3/2003 | Rajasekaran et al. |
| 2005/0119978 | A1 | 6/2005 | Ates |
| 2005/0240522 | A1 | 10/2005 | Kranzley et al. |
| 2006/0006223 | A1 | 1/2006 | Harris |
| 2007/0073629 | A1 | 3/2007 | Montero et al. |
| 2007/0143227 | A1* | 6/2007 | Kranzley ............... G06Q 20/02 705/67 |
| 2008/0155655 | A1 | 6/2008 | Wankmueller |
| 2008/0167961 | A1 | 7/2008 | Wentker et al. |
| 2010/0268648 | A1 | 10/2010 | Wiesman et al. |
| 2010/0332393 | A1* | 12/2010 | Weller ................ G06Q 20/341 705/44 |
| 2011/0119155 | A1 | 5/2011 | Hammad et al. |
| 2011/0153498 | A1 | 6/2011 | Makhotin et al. |
| 2011/0208658 | A1 | 8/2011 | Makhotin |
| 2012/0116976 | A1 | 5/2012 | Hammad et al. |
| 2012/0197760 | A1 | 8/2012 | Balasubramanian et al. |
| 2012/0209657 | A1* | 8/2012 | Connolly ........... G06Q 20/3224 705/7.29 |
| 2014/0358777 | A1* | 12/2014 | Gueh ................ G06Q 20/3223 705/43 |

FOREIGN PATENT DOCUMENTS

| | | | |
|---|---|---|---|
| JP | 2008506206 | A | 2/2008 |
| JP | 2009501981 | A | 1/2009 |
| JP | 2013519136 | A | 5/2013 |
| WO | 02/27631 | A2 | 4/2002 |
| WO | 2007/011695 | A2 | 1/2007 |
| WO | 2011/094556 | A1 | 8/2011 |

OTHER PUBLICATIONS

"PCT International Search Report and Written Opinion" dated Jan. 20, 2016 issued by the International Searching Authority in corresponding Application No. PCT/US2915/059471, 13 pages.

"Intellectual Property Office of Singapore Written Opinion" dated Oct. 19, 2017 issued by the International Searching Authority in corresponding Singapore Application No. 11201703906S, 10 pp.

"Japanese Office Action and English-language Translation", drafting date Jun. 27, 2018, JP Patent Office), for Japanese Application No. 2017-525873, 15pgs.

"Communication pursuant to Article 94(3) EPC: Examination Report", dated Jul. 12, 2018 (dated Jul. 12, 2018), European Patent Office, European Application No. 09819787.4-1222, 5pgs.

"Communication: Extended Supplementary European Search Report", dated Mar. 29, 2018 (dated Mar. 29, 2018), European Patent Office, for European Application No. 15859586.8-1217 / 3218860 PCT/US2015059471, 9pgs.

"Canadian Office Action", dated Mar. 8, 2018 (dated Mar. 8, 2018), Innovation, Science and Economic Development Canada, Canadian Intellectual Property Office, for Canadian Application No. 2,967,781, 4pgs.

"Examination Report No. 1 for standard patent application", dated May 14, 2018, Australian Government IP Australia, for Australian Application No. 2015347054, 5pgs.

European Search Report and Written Opinion dated Jun. 12, 2019 which was issued in connection with EP 15859586.8.

* cited by examiner

PROVIDING ONLINE CARDHOLDER AUTHENTICATION SERVICES ON-BEHALF-OF ISSUERS

CROSS-REFERENCE TO RELATED APPLICATION

This application claims the benefit of U.S. provisional patent application 62/079,211 filed on Nov. 13, 2014, which application is incorporated by reference herein.

FIELD OF THE INVENTION

Embodiments disclosed herein generally relate to techniques for conducting secure online purchase transactions, and more particularly to processes and systems for providing cardholder authentication services on-behalf-of (OBO) issuers utilizing a payment card authorization network to bridge cardholder authentication and transaction authorization processes.

BACKGROUND

Payment card-based transactions are common, and are typically performed across multiple channels of commerce. For example, a consumer may utilize a credit card to perform transactions in-person at a merchant's retail store, via a computer connected to the internet (an online transaction), via a mobile telephone and/or via a company-based call center (e.g., a 1-800 number for a catalog company). These various types of transactions are conducted in different ways, and thus each type of transaction is associated with a different level of fraud risk. In addition, the payment card transactions generally require that the consumer have his or her payment card available to either present to a cashier in a retail environment, or for use to enter the requested information via a web browser for an internet transaction, and/or to provide requested information over the telephone. Those knowledgeable in the field recognize that the risk of financial fraud is greater for a remote transaction because there is less ability for the merchant to verify the identity and authenticity of the cardholder. The nature of such remote transactions, sometimes referred to as "card-not-present" or CNP transactions, therefore increases risk for the merchant, the issuer and the payment card network provider, which often results in more cardholder disputes and associated chargebacks than occur after in-person transactions.

With the advent of e-commerce and m-commerce (mobile commerce), consumers are using portable devices, such as smart phones, tablet computers, laptop computers, digital music players and/or personal digital assistants (PDAs), to make purchases via merchant websites over the internet. Consequently, various techniques have evolved that allow for payment for goods and/or services ordered online using payment card accounts.

Attempts to provide an additional security layer for online credit card and debit card transactions have been proposed, and several different protocols have been adopted by payment card networks. For example, MasterCard International Incorporated provides the MasterCard SecureCode which is based on the 3-D Secure protocol. Within this protocol flows authentication values (Accountholder Authentication Value or "AAV" for the MasterCard 3-D Secure protocol) that are generated by the card issuers that return data about the result of the authentication. This value is placed into a field in the authorization message called the universal cardholder authentication field (UCAF). The SecureCode service is used by member financial institutions (FI's), merchants and MasterCard in collecting and transporting accountholder authentication data generated by issuer and accountholder payment authentication solutions. Thus, the UCAF is intended to be security scheme independent and offers standardized fields and messages for use by merchants and MasterCard members. Once collected by a merchant and their acquirer FI, this information is communicated to the issuer FI in the payment authorization request and provides explicit evidence that the cardholder authentication was successfully completed by the issuer's authentication system or on their behalf. The UCAF supports a variety of issuer security and authentication approaches, including the secure payment application (SPA), issuer servers, smart cards and more. This universal payment mechanism simplifies compatibility and interoperability issues, and keeps costs relatively low when new technologies or upgrades are implemented. Other payment networks utilize similar authentication services, which are generally based on the 3-D Secure protocol, and each of these services requires the merchant's acquiring financial institution (or bank) to add the resulting authentication value into the standard authorization message.

FIG. 1 is a block diagram of a typical transaction system 100 to illustrate an example of the SecureCode authentication process, which involves a number of participants and messages in order to authenticate a cardholder. In order to use SecureCode, a consumer must first visit an issuer enrollment website and provide issuer enrollment data to prove identity, and if appropriate answers are provided, the cardholder is considered authenticated and is permitted to establish a private code or SecureCode to be associated with his or her payment card account number. This private code is stored by the issuer for later use during online purchases at participating merchant websites.

Referring again to FIG. 1, a cardholder desiring to purchase goods and/or services over the internet operates a consumer device, such as a computer 102, and uses his or her internet browser to contact 101 a merchant server 106 to shop at a merchant website. The merchant server 106 includes a merchant plug-in ("MPI") application 108, which will be explained below. After selecting merchandise and/or services, to initiate the purchase, the cardholder provides payment card account information (including a primary account number or "PAN", an expiration date, a cardholder verification value or "CVC2" value, billing address information, and the like) at the merchant's website checkout webpage. The data is then typically transmitted over a secure socket layer ("SSL") connection from the cardholder's computer 102 to the merchant's server computer 106. The merchant website server 106 receives the SSL data, and the MPI 108 generates and sends verification request and verification response messages via a SSL connection 103 to a Directory Service server computer 110 (which may be the MasterCard Directory service). The Directory Service server uses a bank identification number (BIN), which is part of the PAN, to check card range eligibility for the SecureCode service and to identify the relevant issuer financial institution (FI). If the specified PAN is in the eligible payment card range, then the data is transmitted via another SSL connection 105 to an issuer access control server (ACS) 112 to check if the specific account number is enrolled and active to participate in the SecureCode service. If the cardholder is enrolled, the ACS 112 establishes a secure session via connection 107 with the merchant server computer 106, and the MPI 108 creates a payer authentication request message which is transmitted back to the ACS 112.

When the ACS 112 receives the payer authentication request message, it causes an authentication dialog to begin with the cardholder which causes a separate authentication window to appear in the cardholder's browser on his or her consumer device 102. The authentication window, which is typically presented during the shopping checkout process, prompts the cardholder to enter his or her private code or SecureCode. Using the consumer device 102, the consumer enters the private code and the cardholder's browser then redirects 109 the information to the ACS 112 for authentication. If the private code is correct, then the cardholder is authenticated, an accountholder authentication variable ("AAV") is returned to the MPI 108 of the merchant server 106, and the cardholder authentication window disappears. The AAV is a SecureCode specific token that uses the UCAF field for transport within the authorization messages. Thus, at this point in the process, the merchant server 106 transmits 111 the AAV to a gateway/acquirer system 114 as part of a purchase authorization request. Next, the gateway/acquirer system 114 submits 113 the purchase authorization request to a payment network 116, which forwards 115 the authorization request message to the appropriate issuer server computer 118 for conventional purchase transaction authorization processing.

The 3-D Secure authentication process thus provides a higher level of payment account authentication during online transactions which reduces "unauthorized transaction" chargebacks for merchants. However, as illustrated above with regard to FIG. 1, such 3-D Secure processes can be unwieldy and involve a large number of messages and participants. In addition, once the cardholder authentication process is completed, the merchant server 106 and/or a merchant acquirer computer are responsible for adding the accountholder authentication value (AAV) to the authorization message and setting corresponding security indicators that convey the authentication result to the issuer FI server 118. Due to this requirement, the issuer FI server 118 (or other issuer authorization system) may be set to ignore the accountholder authentication value due to distrust of the content. Yet further, some issuer FI authentication and/or authorization systems are not linked and/or may be outsourced to third party service providers, and the authentication result of the 3-D Secure process is not well utilized by such authorization systems to enhance the confidence in card-not-present (CNP) transactions.

Strong payment card account authentication methods are mandated in many regions throughout the world, and the 3-D Secure methods described above typically satisfy such requirements. However, authorization approval rates for card-not-present transactions are still considerably lower than that for card present transactions. Accordingly, it would be desirable to provide an authentication services on-behalf-of (OBO) issuers cardholder authentication service on a payment card authorization network that carries out the accountholder authentication variable (AAV) validation on-behalf of Issuer financial institutions in a manner that increases the overall confidence of the payment account transaction.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate exemplary embodiments and which are not necessarily drawn to scale, wherein.

DETAILED DESCRIPTION

Figure 1:
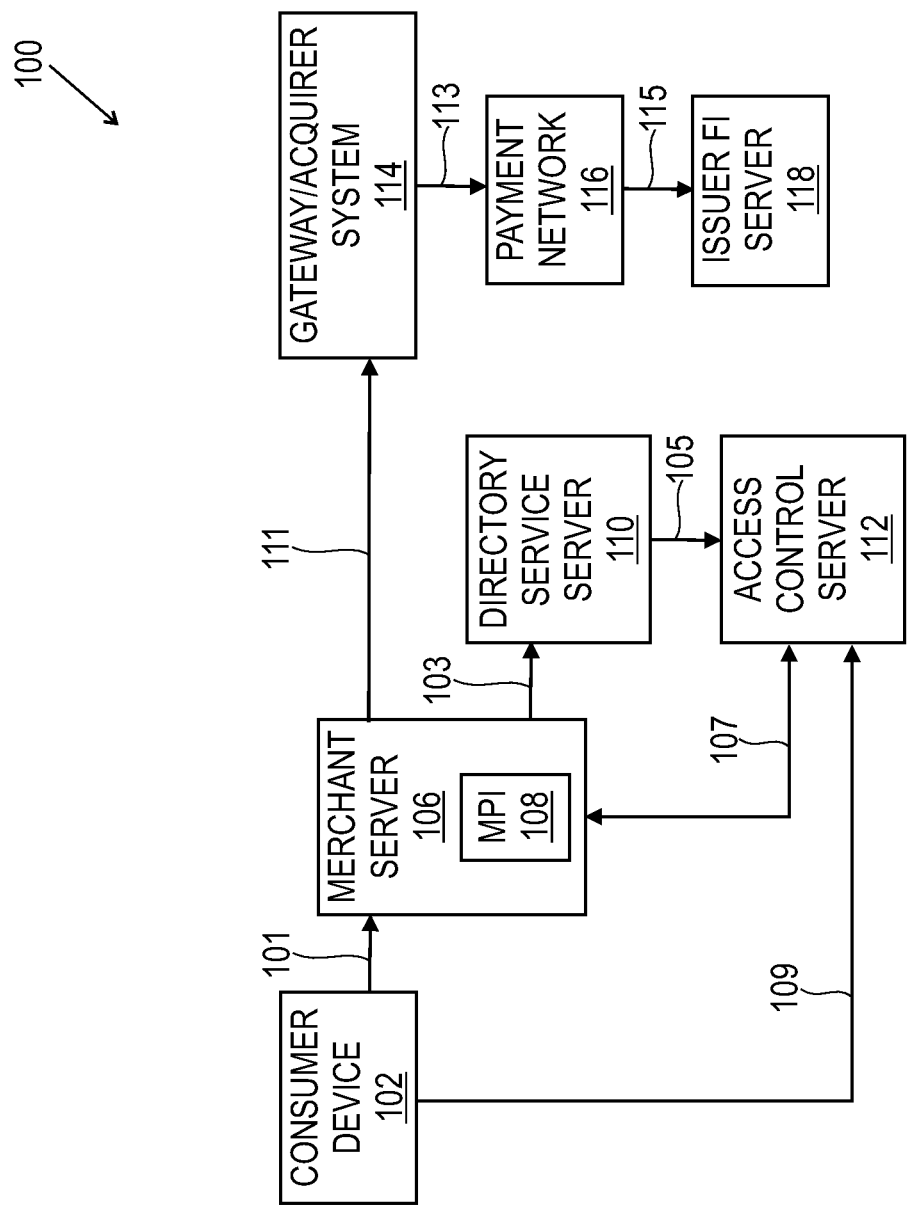
FIG. 1 is a block diagram of a transaction system to illustrate a conventional 3-D Secure authentication process.

Reference will now be made in detail to various embodiments according to the present disclosure. Examples of these embodiments are illustrated in the accompanying drawings, and it should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

Embodiments relate to payment card account authentication processes, and more particularly, to online or remote payment card authentication processes, which are also sometimes referred to as "card-not-present" or "CNP" transactions. For example, a remote authentication process may include a process where a consumer is making a purchase or other transaction with a remote website or merchant server (e.g., over the Internet) using a browser on a mobile device (such as a mobile telephone, smartphone, tablet computer, and/or laptop computer and the like). A remote authentication process may also include a process where a consumer is making a purchase or other transaction with a remote website or server using a browser on a personal computer or any other type of Internet-connected device (such as a television, household appliance, office device, laptop, tablet computer, or the like). Thus, embodiments of the authentication process described herein pertain to card-not-present (CNP) transactions wherein a novel on-behalf-of (OBO) issuer service process operates to carry out a universal cardholder authentication field (UCAF) or a MasterCard advance registration program (MARP) (i.e., a 3-D Secure-type process) scheme which collects an authentication value from a 3-D Secure cardholder challenge phase and subsequently intercepts the "0100" authorization message en-route to the Issuer FI computer. Such a process allows both validation of the authentication value as well as insertion of the actual value into the authorization message on-behalf-of (OBO) the issuer, thus increasing the overall confidence of the transaction.

A number of terms will be used herein. The use of such terms are not intended to be limiting, but rather are used for convenience and ease of exposition. For example, as used herein, the term "cardholder" may be used interchangeably with the term "consumer" and are used herein to refer to a consumer, individual, business or other entity that has been issued (or authorized to use) a financial account such as a payment card account (for example, a credit card account or a debit card account). The financial account may be accessed by use of a "payment card" or "payment device" such as a traditional plastic or embossed magnetic stripe card, a chip card (such as an EMV card) or a radio-frequency identification (RFID) card (such as a PayPass™ card) or other type of contactless payment card. Pursuant to some embodiments, as used herein, the term "payment card" or "payment device" may also include a mobile device (such as a mobile telephone, a smartphone, a tablet computer, a laptop computer, and/or a personal digital assistant) operating a payment application that includes stored payment account information.

Figure 2:
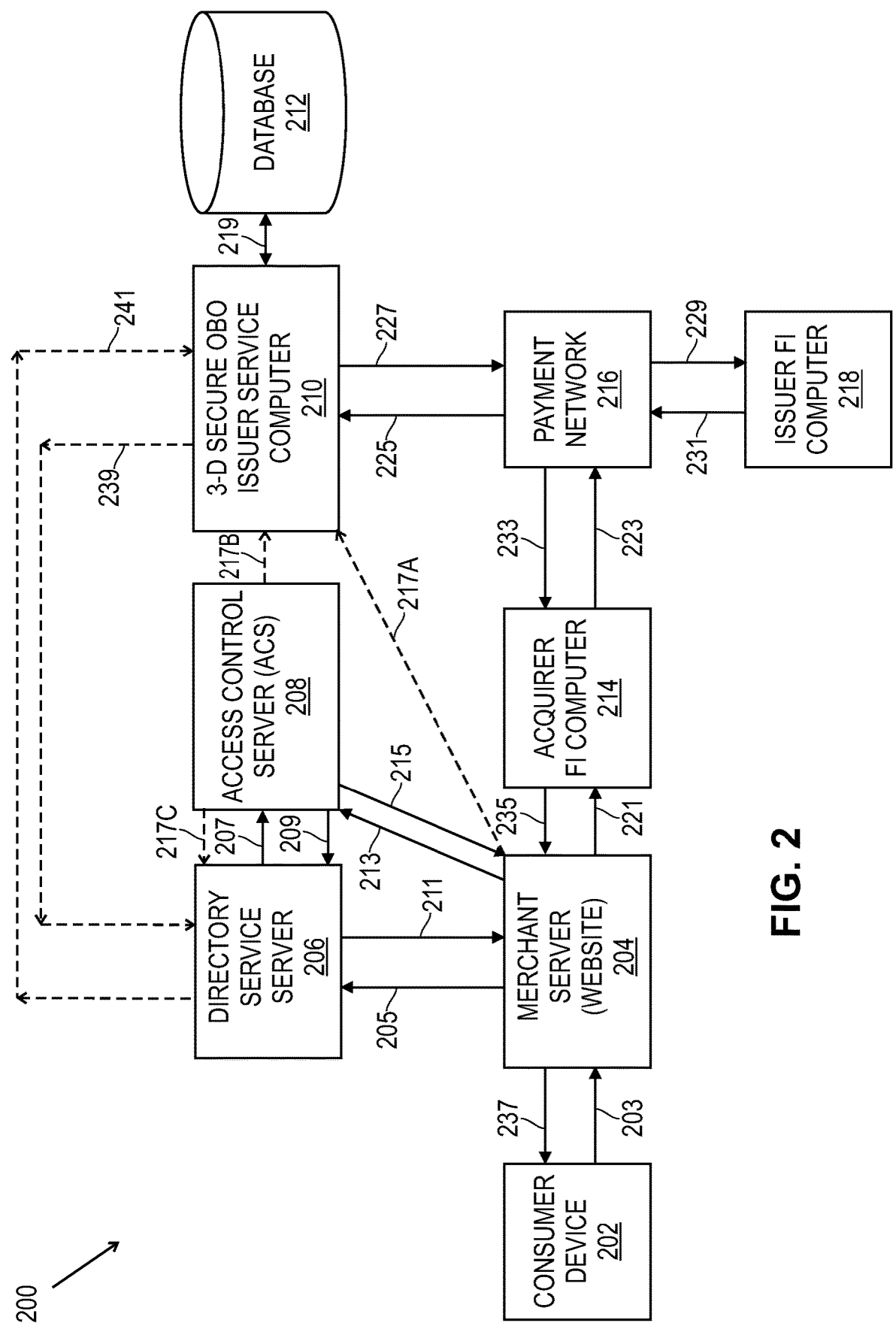
FIG. 2 is a block diagram of a transaction system to illustrate examples of 3-D Secure on-behalf-of ("OBO") issuer interception and validation processes in accordance with some embodiments of the disclosure.

FIG. 2 is a block diagram of a transaction system 200 to illustrate several examples of a 3-D Secure on-behalf-of ("OBO") issuer interception and validation process in accordance with some embodiments. A 3-D Secure OBO issuer service computer 210 is shown, which may be operated by a service provider (which may be a third party provider), whereas in other implementations the 3-D Secure OBO issuer service computer 210 is operated by a payment card account processing company (such as MasterCard International Incorporated). In a particular example, an issuer financial institution (FI), such as a member bank of a payment card processor, may enroll with an issuer OBO interception and validation service in order to receive authorization messages for online transactions that include the actual universal cardholder authentication field ("UCAF") to increase overall confidence in purchase transactions. In accordance with some implementations, cardholders (consumers) and merchants may be unaware that 3-D Secure issuer processing has occurred or is occurring during online purchase transactions that involve the merchant's store website. In addition, in some embodiments the entity providing the 3-D Secure OBO issuer service (which provides an interception and validation service) may charge a fee or fees to issuer FIs for providing the service. But in other implementations, the entity responsible for providing the 3-D Secure OBO issuers service (for example, a payments processing company such as MasterCard International Incorporated) may not charge a fee or impose only a nominal fee for the issuer service as an incentive to increase adoption of their payment network and/or systems. It should also be understood that some or all of the computer components of the transaction system 200 may include one or more special purpose computers or processing devices which may be configured to process data in accordance with one or more of the 3-D Secure OBO issuer service processes described herein.

Referring again to FIG. 2, a cardholder desiring to purchase goods and/or services over the internet operates his or her consumer device 202 (which may be a mobile device such as a smartphone and/or tablet computer, a desktop computer, or the like), and in some implementations uses an internet browser to communicate via connection 203 with a merchant server 204 to shop at the merchant's website. The purchase transaction system 200 also includes a directory service server computer 206, an access control server (ACS) computer 208, a 3-D Secure on-behalf-of (OBO) issuer service computer 210, a transaction database 212, an acquirer FI computer 214, a payment network 216 and an issuer FI computer 218. It should be understood, however, that the purchase transaction system 200 may include a plurality of merchant server computers, directory service server computers, ACS computers, 3-D Secure OBO issuer service computers, acquirer FI computers and issuer FI computers, but only one of each of these devices is shown in FIG. 2 for ease of understanding. It should be understood that the various computers and/or computer systems shown in FIG. 2 may be configured to communicate directly with one another via, for example, secure connections, or may be configured to communicate via the Internet and/or via other types of computer networks and/or communication systems in a wired or wireless manner.

A cardholder uses his or her consumer device 202 and browser software (for example, Internet Explorer™, Google™ Chrome, Firefox™ and the like) to browse the offerings on the merchant's website, selects merchandise and/or services and then initiates a purchase transaction by providing payment card account information at the merchant's website checkout webpage (not shown) hosted by the merchant server 204. The payment account information typically includes a primary account number or "PAN", an expiration date, a cardholder verification value or "CVC2" value, cardholder address information, and the like. (In the case of a repeat customer, the merchant website may already have much if not all of the consumer's payment account data saved in a secure storage element, and thus the merchant's checkout webpage may be configured to automatically populate most, if not all, of the required payment account data.)

Referring again to FIG. 2, the merchant website server 204 transmits 205 a verify enrollment request ("VEReq") message or other authentication request message to a Directory Service server computer 206 (for example, a service directory computer operated by a payment card system provider, such as MasterCard International Incorporated). The Directory Service computer 206 provides centralized decision-making capabilities to merchants and uses the account number in the VEReq message to direct 207 that VEReq to an appropriate issuer Access Control Server (ACS) 208. Upon receipt of the VEReq, the ACS 208 verifies whether the cardholder's payment card account is enrolled in a 3-D Secure service (for example, the cardholder's primary account number (PAN) may indicate enrollment) and if so the ACS 208 transmits 209 a positive verify enrollment response ("VERes") message to the Directory Service server computer 206, which message includes the address of the ACS 208. The Directory Service server computer 206 then forwards 211 the positive VERes with the ACS address to the merchant server computer 204. The merchant server then generates a payer authentication request ("PAReq") message to authenticate the consumer (payer) for that particular online purchase and transmits 213 the PAReq message directly to the ACS 208 (by using the ACS address) for cardholder authentication.

If the ACS 208 successfully authenticates the cardholder, the ACS 208 then generates a positive authentication result message, which in some embodiments may be a positive payer authentication response ("PARes") message which includes a Universal Cardholder Authentication Field ("UCAF"). The positive PARes message is transmitted 215 to the merchant server 204. According to a first embodiment, the merchant server 204 then transmits 217A the PARes message to the 3-D Secure OBO issuer service computer 210, which then securely stores 219 the PARes message (which includes the UCAF and other transaction data) in the transaction database 212. The transaction database 212 may be a separate secure storage device (as shown), or may be a secure element or secure portion of an internal memory (not shown) of the 3-D Secure OBO issuer service computer 210. In some embodiments, the positive authentication result message, such as the positive PARes message, includes fields containing one or more of the cardholder's primary account number ("PAN"), an acquirer identifier, a merchant identifier, the date and/or time of the transaction, the transaction amount, a transaction currency code, and the UCAF. In addition, in some implementations a transaction identifier ("XID") is included in the authentication result message or the PARes message.

Referring again to FIG. 2, when the merchant server 204 receives 215 the positive PARes message, in addition to transmitting 217A the PARes message to the 3-D Secure OBO issuer service computer 210, a Merchant Service Provider Application Programming Interface (API) (not shown) resident in the merchant server 204 processes a service call to obtain the authentication value (such as an Accountholder Authorization Value (AAV)), and processes another service call to authorize the authentication value. (Such a Merchant Service Provider registered the merchants associated with a given acquirer FI and obtained data needed to authorize the authentication value, and has the interface with the acquirer FI.) Alternately, the Merchant Service Provider may process a single API call (for example, if the authentication value was successfully received then the API performs the authorization). Once the authentication value is authorized, the merchant server 204 generates and transmits 221 a purchase transaction authorization request to the acquirer financial institution (FI) computer 214. The acquirer FI computer 214 receives the purchase transaction authorization request and then forwards 223 the purchase transaction authorization request to a payment network 216 (which includes one or more computers and/or computer systems). The payment network 216 receives the purchase transaction authorization request and determines whether or not the bank identification number (BIN) of the cardholder's PAN falls within a range of PANs eligible for 3-D Secure OBO issuer service processing. (In some embodiments, one or more BIN ranges indicating payment card account eligibility is obtained from each issuer FI at the time a particular issuer FI registered or enrolled for 3-D Secure OBO issuer service processing, and these BIN ranges are then provided to the payment network 216.) When a BIN is matched to a BIN range, the payment system network 216 then transmits 225 the purchase transaction authorization request to the 3-D Secure OBO issuer service computer 210 for processing. The 3-D Secure OBO issuer service computer then compares data in the purchase transaction authorization request (which includes the PARes data) with the information stored in the secure transaction database 212 (the PARes data stored earlier) to determine if 3-D Secure OBO issuer processing occurred. If there is a match, then in some embodiments, the 3-D Secure OBO issuer service computer next calculates a time difference value equal to the difference between the time and date of the online or remote purchase transaction (which was stored with the PARes data in the transaction database 212) with the time and date of receipt of the purchase transaction authorization request. If the time difference value falls within a predetermined period of time (or predetermined time range) then the 3-D Secure OBO issuer service computer conducts further processing. However, if the time difference value falls outside the predetermined time range, then the 3-D Secure OBO issuer service computer may decline the purchase transaction authorization request. In some embodiments, when such a decline occurs then a Response Code may be set indicating that a decline occurred and the 3-D Secure OBO issuer service computer 210 may record the decline outcome by storing an indication of a timeout event in the transaction database 212. In addition, the 3-D Secure OBO issuer service computer 210 may also generate a Decline advice message and transmit it to the cardholder's issuer FI computer 218 via the payment network 216 (or in some embodiments directly) to notify the issuer FI that the 3-D Secure OBO issuer service computer 210 declined a purchase transaction authorization request on their behalf.

It should be understood that, in some embodiments each issuer FI provides a predetermined time range or predetermined time period in accordance with their own policies, criteria and/or business rules for determining whether or not any particular online transaction authorization request message is timely received by the OBO issuer service computer. In some embodiments, the predetermined time range may be on the order of from about 1 second to about 120 seconds (two minutes) because speedy web service calls are not guaranteed. For example, there may be one or more slow connections or broken connections in a particular transaction system, and/or a contingency may arise that delays a web service call. In yet other embodiments, due to business conditions and/or policies, the predetermined time range may be much longer, for example, from about 1 second to about twenty-four hours.

Referring again to FIG. 2, in the case of a match occurring between the PARes information stored in the transaction database 212 and the data contained in the purchase transaction authorization request and timely receipt of the purchase transaction authorization request message, then the 3-D Secure OBO issuer service computer 210 compares the UCAF from the purchase transaction authorization request to the stored UCAF. Since there is a match, the 3-D Secure OBO issuer service computer records the outcome and otherwise leaves the purchase transaction authorization request message intact. The 3-D Secure OBO issuer service computer 210 then transmits 227 the purchase transaction authorization request to the payment network 216. The payment network 216 then forwards 229 the purchase transaction authorization request to the issuer FI computer 218. Upon receipt of the purchase transaction authorization request message, the issuer FI computer 218 recognizes that it contains a valid UCAF because it includes a BIN that falls within a BIN range specified by the issuer FI when registering for 3-D Secure OBO issuer service processing and thus performs authorization processing as a 3-D Secure transaction. Thus, in this manner, the issuer FI computer 218 recognizes that the cardholder has been authenticated using a 3-D Secure authorization protocol that included a valid UCAF, and proceeds to process the updated purchase transaction authorization request accordingly. The issuer FI computer 218 therefore determines whether or not the consumer's payment card account is in good standing and/or whether the cardholder can or cannot afford to pay for the purchase transaction (for example, if the cardholder has an adequate credit line available to cover the purchase price for the transaction).

If all is in order, the issuer FI transmits 231 a positive purchase transaction authorization or "transaction approved" response to the payment network 216 which is then routed or transmitted 233 through to the acquirer FI 214. In some implementations, the acquirer FI transmits 235 the transaction approved message to the merchant server 204, which transmits 237 a message to the consumer device 202. In some cases, the transaction approved message may appear, for example, on a display screen of the consumer's device and may be worded: "Thank you for your purchase." Thus, in this case the fact that the purchase transaction authorization request passed through the OBO validation process indicates that the 3-D Secure OBO issuer service computer 210 has validated the UCAF. The issuers FI computer 218 therefore is assured that the actual result of the cardholder authentication that occurred utilizing the Access Control Server (ACS) 208 and that was transmitted to the merchant server 204 is the same as the result that was sent through via the payment network 216 to their authorization systems. Such processing improves the trust of the data in the authentication fields and will helps the issuer FI computer 218 with acceptance of the purchase transaction since they can be guaranteed that their authorization systems are not receiving altered data.

However, if the 3-D Secure OBO issuer service computer 210 determines that a mismatch occurred between the PARes information stored in the transaction database 212 and the data contained in the purchase transaction authorization request then, depending on issuer FI rules, the purchase transaction authorization request may be declined. In particular, in some embodiments a Response Code is set to indicate that a decline occurred, and an AAV response code is set to indicate an AAV mismatch. In addition, the 3-D Secure OBO issuer service computer 210 may record the decline outcome, and if desired a subsequent Decline advice message may be provided to notify the issuer FI that the 3-D Secure OBO issuer service computer 210 declined a purchase transaction authorization request on their behalf. In some other embodiments, the Authorization message is amended on-behalf-of (OBO) the issuer FI computer with the AAV and status sent by the ACS 208, regardless of what the acquirer FI 214 placed in the 0100 message. In particular, a Code may be utilized to indicate an updated AAV that could be placed in the appropriate field for the issuer system to consume.

In an alternate embodiment of the process, during the 3-D secure challenge phase of processing (with reference to FIG. 2), if the ACS 208 successfully authenticates the cardholder, as explained above, then a positive authentication result message, such as a positive payer authentication response ("PARes") message, is generated which includes the UCAF. The positive authentication result message or positive PARes message is transmitted 215 to the merchant server 204. In accordance with the alternate embodiment, the ACS 208 also transmits 217B the PARes message to the 3-D Secure OBO issuer service computer 210, which then securely stores 219 the PARes message (which includes the UCAF and other transaction data) in the transaction database 212. As explained above, the positive authentication result message, such as the positive PARes message, may include one or more fields that contain the cardholder's primary account number ("PAN"), an acquirer identifier, a merchant identifier, the date and/or time of the transaction, the transaction amount, a transaction currency code, and the UCAF. Some implementations may also include a transaction identifier ("XID") in the authentication result message or the PARes message.

When the merchant server 204 receives 215 the positive PARes message, a Merchant Service Provider Application Programming Interface (API) (not shown) resident in the merchant server 204 processes a service call to obtain the authentication value, and processes another service call to authorize the authentication value. (As explained above, the Merchant Service Provider registered the merchants associated with a given acquirer FI, obtained data needed to authorize the UCAF, and has the interface with the acquirer FI.) Alternately, a single API call may be processed (for example, if the authentication value was successfully received then the API performs the authorization). Once the authentication value is authorized, the merchant server 204 generates and transmits 221 a purchase transaction authorization request to the acquirer financial institution (FI) computer 214.

The acquirer FI computer 214 then forwards 223 the purchase transaction authorization request to the payment network 216. The payment network 216 receives the purchase transaction authorization request and then determines whether or not the bank identification number (BIN) of the cardholder's PAN falls within a range of PANs eligible for 3-D Secure OBO issuer service processing. (In some embodiments, one or more BIN ranges indicating payment card account eligibility is obtained from each issuer FI at the time a particular issuer FI registered or enrolled for 3-D Secure OBO issuer service processing, and these BIN ranges provided to the payment network 216.) The payment system network 216 next transmits 225 the purchase transaction authorization request to the 3-D Secure OBO issuer service computer 210, which compares data in the purchase transaction authorization request (which includes the PARes data) with the information stored in the secure transaction database 212 (the PARes data stored earlier). If there is a match, then in some embodiments, the 3-D Secure OBO issuer service computer next calculates a time difference value equal to the difference between the time and date of the online or remote purchase transaction (which was stored with the PARes data in the transaction database 212) with the time and date of receipt of the purchase transaction authorization request. If the time difference value falls within a predetermined period of time (or predetermined time range) then the 3-D Secure OBO issuer service computer conducts further processing. However, if the time difference value falls outside the predetermined time range, then the 3-D Secure OBO issuer service computer may decline the purchase transaction authorization request. In some embodiments, when such a decline occurs then a Response Code may be set indicating that a decline occurred and the 3-D Secure OBO issuer service computer 210 may record the decline outcome by storing an indication of a timeout event in the transaction database 212. In addition, the 3-D Secure OBO issuer service computer 210 may also generate a Decline advice message and transmit it to the cardholder's issuer FI computer 218 via the payment network 216 (or in some embodiments directly) to notify the issuer FI that the 3-D Secure OBO issuer service computer 210 declined a purchase transaction authorization request on their behalf.

Referring again to FIG. 2, in the case of a match occurring between the PARes information stored in the transaction database 212 and the data contained in the purchase transaction authorization request (and if the time difference value falls within the predetermined range, as explained above, indicating timely receipt of the purchase transaction authorization request message), then the 3-D Secure OBO issuer service computer 210 compares the UCAF from the purchase transaction authorization request to the stored UCAF. When there is a match, the 3-D Secure OBO issuer service computer records the outcome and otherwise leaves the purchase transaction authorization request message intact. The 3-D Secure OBO issuer service computer 210 then transmits 227 the purchase transaction authorization request to the payment network 216. The payment network 216 then forwards 229 the purchase transaction authorization request to the issuer FI computer 218. Upon receipt of the purchase transaction authorization request message, the issuer FI computer 218 recognizes that it contains a valid UCAF because it includes a BIN that falls within a BIN range specified by the issuer FI when registering for 3-D Secure OBO issuer service processing, and the issuer FI computer 218 thus performs authorization processing as a 3-D Secure transaction. Thus, in this manner, the issuer FI computer 218 recognizes that the cardholder has been authenticated using a 3-D Secure authorization protocol that included a valid UCAF, and proceeds to process the updated purchase transaction authorization request accordingly. The issuer FI computer 218 therefore determines whether or not the consumer's payment card account is in good standing and/or whether the cardholder can or cannot afford to pay for the purchase transaction (for example, if the cardholder has an adequate credit line available to cover the purchase price for the transaction).

If all is in order, the issuer FI transmits 231 a positive purchase transaction authorization or "transaction approved" response to the payment network 216 which is then routed or transmitted 233 through to the acquirer FI 214. The acquirer FI may then transmit 235 the transaction approved message to the merchant server 204, which transmits 237 a message to the consumer device 202. In this case, the fact that the purchase transaction authorization request passed through the OBO validation process indicates that the 3-D Secure OBO issuer service computer 210 has validated the UCAF. As explained above, the issuers FI computer 218 therefore is assured that the actual result of the cardholder authentication that occurred utilizing the Access Control Server (ACS) 208 and that was transmitted to the merchant server 204 is the same as the result that was sent through via the payment network 216 to their authorization systems. Such processing improves the trust of the data in the authentication fields and helps the issuer FI computer 218 with acceptance of the purchase transaction since they can be guaranteed that their authorization systems are not receiving altered data.

However, the 3-D Secure OBO issuer service computer 210 may determine that a mismatch occurred between the PARes information stored in the transaction database 212 and the data contained in the purchase transaction authorization request then. In this case, depending on issuer FI rules, the purchase transaction authorization request may be declined. In particular, in some embodiments a Response Code is set to indicate that a decline occurred, and a UCAF response code is set to indicate a UCAF mismatch. In addition, the 3-D Secure OBO issuer service computer 210 may record the decline outcome. In addition, a subsequent Decline advice message may be transmitted to the issuer FI computer 218 to notify the issuer that the 3-D Secure OBO issuer service computer 210 declined a purchase transaction authorization request on their behalf. In some other embodiments, the Authorization message is amended on-behalf-of (OBO) the issuer FI computer with the UCAF and status sent by the ACS 208, regardless of what the acquirer FI 214 placed in the "0100" message. In particular, a Code may be utilized to indicate an updated UCAF that could be placed in the appropriate field for the issuer system to consume.

In yet another embodiment of the process, during the 3-D secure challenge phase of processing, if the ACS 208 successfully authenticates the cardholder then, as explained above, a positive payer authentication response ("PARes") message is generated which includes the UCAF. As before, the positive PARes message is transmitted 215 to the merchant server 204. In accordance with this additional embodiment, the ACS 208 also transmits 217C the PARes message to the Directory Service Server 206, which stores the PARes message (which includes the UCAF and other transaction data). As also explained earlier, when the merchant server 204 receives 215 the positive PARes message, it generates and then transmits 221 a purchase transaction authorization request to an acquirer FI computer 214 which then forwards 223 the purchase transaction authorization request to the payment network 216.

In this implementation, the payment network 216 receives the purchase transaction authorization request and determines whether or not the bank identification number (BIN) of the cardholder's PAN falls within a range of PANs eligible for 3-D Secure OBO issuer service processing. (As explained above, one or more BIN ranges indicating payment card account eligibility was obtained from each issuer FI at the time a particular issuer FI registered or enrolled for 3-D Secure OBO issuer service processing, and these BIN ranges provided to the payment network 216.) When the payment network determines that the cardholder's PAN does fall within a range of PANs eligible for 3-D Secure OBO issuer service processing, the payment system network 216 transmits 225 the purchase transaction authorization request message to the 3-D Secure OBO issuer service computer 210. (In some implementations, a request for 3-D processing is transmitted to the 3-D Secure OBO issuer service computer along with the purchase transaction authorization request message.) When the 3-D Secure OBO issuer service computer 210 receives the purchase transaction authorization request message, it transmits a request 239 to the Directory Service Server 206 for the stored PARes message associated with the purchase transaction that is the subject of the purchase transaction authorization request message. Thus, in some embodiments, the 3-D Secure OBO issuer service computer includes a portion of the transaction data contained within the purchase transaction authorization request message with the request to enable the Directory Service Server 206 to locate the stored PARes message. When found, the Directory Service Server 206 transmits 241 the PARes message to the 3-D Secure OBO issuer service computer 210, which compares the data of the PARes message to the data contained within the purchase transaction authorization request. If the data matches, then in some embodiments the 3-D Secure OBO issuer service computer next generates a time difference value by comparing the time and date of the online or remote purchase transaction (which was stored with the PARes data) with the time and date of receipt of the purchase transaction authorization request message by the payment network. If the time difference value falls within a predetermined time range, then the 3-D Secure OBO issuer service computer conducts further processing. However, if the time difference value falls outside the predetermined time range, then the 3-D Secure OBO issuer service computer may decline the purchase transaction authorization request. In some embodiments, when such a decline event occurs then a Response Code may be set by the 3-D Secure OBO issuer service computer indicating that such a decline occurred. In addition, the 3-D Secure OBO issuer service computer 210 may record the decline outcome by storing an indication of a timeout event in the transaction database 212. The 3-D Secure OBO issuer service computer 210 may also generate a Decline advice message and transmit it to the cardholder's issuer FI computer 218 via the payment network 216 (or in some embodiments directly) to notify the issuer FI that the 3-D Secure OBO issuer service computer 210 declined a purchase transaction authorization request on their behalf.

In the case of a match occurring between the PARes message information from the Directory Service Computer 206 and the data contained in the purchase transaction authorization request message (and in some embodiments, if the time difference value also falls within the predetermined time range, as explained above), then the 3-D Secure OBO issuer service computer records the outcome and otherwise leaves the purchase transaction authorization request message intact. The 3-D Secure OBO issuer service computer 210 then transmits 227 the purchase transaction authorization request to the payment network 216. The payment network 216 then forwards 229 the purchase transaction authorization request to the issuer FI computer 218. Upon receipt of the purchase transaction authorization request message, the issuer FI computer 218 recognizes that it contains a valid UCAF because it includes a BIN that falls within a BIN range specified by the issuer FI when registering for 3-D Secure OBO issuer service processing, and the issuer FI computer 218 thus performs authorization processing as a 3-D Secure transaction. Thus, in this manner, the issuer FI computer 218 recognizes that the cardholder has been authenticated using a 3-D Secure authorization protocol that included a valid UCAF, and proceeds to process the updated purchase transaction authorization request accordingly. The issuer FI computer 218 therefore determines whether or not the consumer's payment card account is in good standing and/or whether the cardholder can or cannot afford to pay for the purchase transaction (for example, if the cardholder has an adequate credit line available to cover the purchase price for the transaction).

If all is in order, the issuer FI transmits 231 a positive purchase transaction authorization or "transaction approved" response to the payment network 216 which is then routed or transmitted 233 through to the acquirer FI 214. The acquirer FI may then transmit 235 the transaction approved message to the merchant server 204, which transmits 237 a message to the consumer device 202. In this case, the fact that the purchase transaction authorization request passed through the OBO validation process indicates that the 3-D Secure OBO issuer service computer 210 has validated the UCAF. As explained above, the issuers FI computer 218 therefore is assured that the actual result of the cardholder authentication that occurred utilizing the Access Control Server (ACS) 208 and that was transmitted to the merchant server 204 is the same as the result that was sent through via the payment network 216 to their authorization systems. Such processing improves the trust of the data in the authentication fields and helps the issuer FI computer 218 with acceptance of the purchase transaction since they can be guaranteed that their authorization systems are not receiving altered data.

However, the 3-D Secure OBO issuer service computer 210 may determine that a mismatch occurred between the PARes information received from the Directory Service Server computer 206 and the data contained in the purchase transaction authorization request. In this case, depending on issuer FI rules, the purchase transaction authorization request may be declined. In particular, in some embodiments a Response Code is set to indicate that a decline occurred, and an UCAF response code is set to indicate an UCAF mismatch. In addition, the 3-D Secure OBO issuer service computer 210 may record the decline outcome. In addition, a subsequent Decline advice message may be transmitted to the issuer FI computer 218 to notify the issuer that the 3-D Secure OBO issuer service computer 210 declined a purchase transaction authorization request on their behalf. In some other embodiments, the Authorization message is amended on-behalf-of (OBO) the issuer FI computer with the UCAF and status sent by the ACS 208, regardless of what the acquirer FI 214 placed in the "0100" message. In particular, a Code may be utilized to indicate an updated UCAF that could be placed in the appropriate field for the issuer system to consume.

Figure 3:
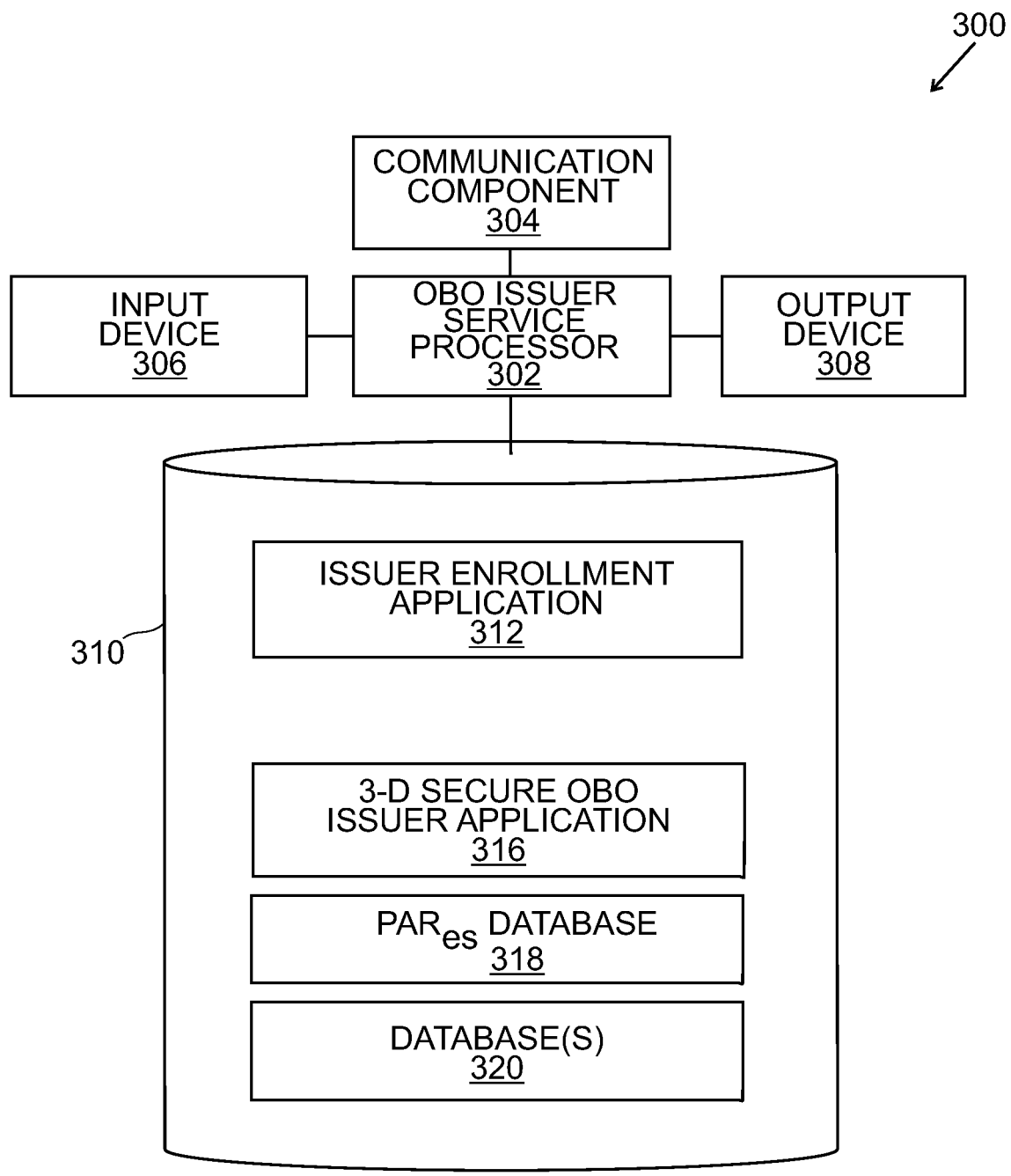
FIG. 3 is a block diagram of an embodiment of an 3-D Secure OBO issuer service computer according to an embodiment of the disclosure.

FIG. 3 is a block diagram of an embodiment of a 3-D Secure OBO issuer service computer 300 according to an embodiment. The 3-D Secure OBO issuer service computer may be controlled by software to cause it to operate in accordance with aspects of the methods presented herein. In particular, the 3-D Secure OBO issuer service computer 300 may include an OBO issuer service processor 302 that is operatively coupled to a communication component 304, an input device 306, an output device 308, and to a storage device 310.

The OBO issuer service processor 302 may be a special purpose computer processor, and is configured to execute processor-executable steps, contained in program instructions described herein, so as to control the merchant OBO service computer 300 to provide desired functionality.

Communication component 304 may be used to facilitate communication with, for example, other electronic devices such as server computers (such as for receiving data from an access control server (ACS) computer over the internet or another type of network connection, including a proprietary and/or secure network connection). The communication component 304 may also, for example, have capabilities for engaging in data communications over computer-to-computer data networks, and such data communications may be in digital form and/or in analog form.

Input device 306 may comprise one or more of any type of peripheral device(s) typically used to input data into a computer. For example, the input device 306 may include a keyboard and a mouse and/or a touchpad or touchscreen that may be used, for example, by a systems engineer or other personnel authorized to, for example, perform 3-D Secure OBO issuer service computer maintenance, upgrades and/or other tasks. The output device 308 may comprise, for example, a display and/or a printer or any other peripheral output device.

Storage device 310 may comprise any appropriate information storage device, including combinations of magnetic storage devices (e.g., magnetic tape and/or hard disk drives), optical storage devices such as CDs and/or DVDs, and/or semiconductor memory devices such as Random Access Memory (RAM) devices and Read Only Memory (ROM) devices, solid state drive (SSD) devices, and/or flash memory devices. Any one or more of the listed storage devices may be referred to as a "memory", "storage", "storage device", a "storage medium", or a "computer readable medium." In addition, the non-transitory storage devices are configurable and/or capable of storing instructions, code and/or data, including instructions configured to cause the OBO issuer service processor 302 to execute one or more of the processes described herein. Thus, the storage device 310 stores one or more programs for controlling the processor 302, and the programs comprise program instructions that contain processor-executable process steps of the 3-D Secure OBO issuer service computer 300, including, in some cases, process steps that constitute processes provided in accordance with principles of the processes presented herein.

In some embodiments, the programs include an issuer enrollment application 312 that manages processes by which a plurality of issuer financial institutions (FIs) register or enroll for the 3-D Secure OBO issuer authentication service with the 3-D Secure OBO issuer service computer 300. In some embodiments, an issuer OBO service enrollment process allows an issuer to register by providing an issuer identifier (issuer ID), issuer name, and/or other required issuer data, for example, by utilizing a suitable web page hosted by the 3-D Secure OBO issuer service computer 300. Other types of enrollment processes can also be utilized.

The storage device 310 also stores a 3-D Secure OBO issuer application 316 for controlling the 3-D Secure OBO issuer service computer 300 to provide issuer OBO processing that includes, in accordance with the disclosure herein, comparing a stored UCAF with the data contained in a purchase transaction authorization request, and, if a match occurs, recording the outcome and otherwise leaving the purchase transaction authorization request message intact so that an issuer will still be aware that the purchase transaction authorization request contained a valid UCAF. The a 3-D Secure OBO issuer application 316 may also operate to transmit the purchase transaction authorization request to a payment network for authorization processing as a 3-D Secure transaction. In addition, the storage device 310 may include a PARes message database 318, and one or more additional databases 320 that are maintained by the 3-D Secure OBO insure service computer 300 on the storage device 310. Among these databases may be, for example, an issuer ID database and the like.

The application programs of the 3-D Secure OBO merchant service computer 300, as described above, may be combined in some embodiments, as convenient, into one, two or more application programs. Moreover, the storage device 310 may store other programs or applications, such as one or more operating systems, device drivers, database management software, web hosting software, and the like.

Figure 4:
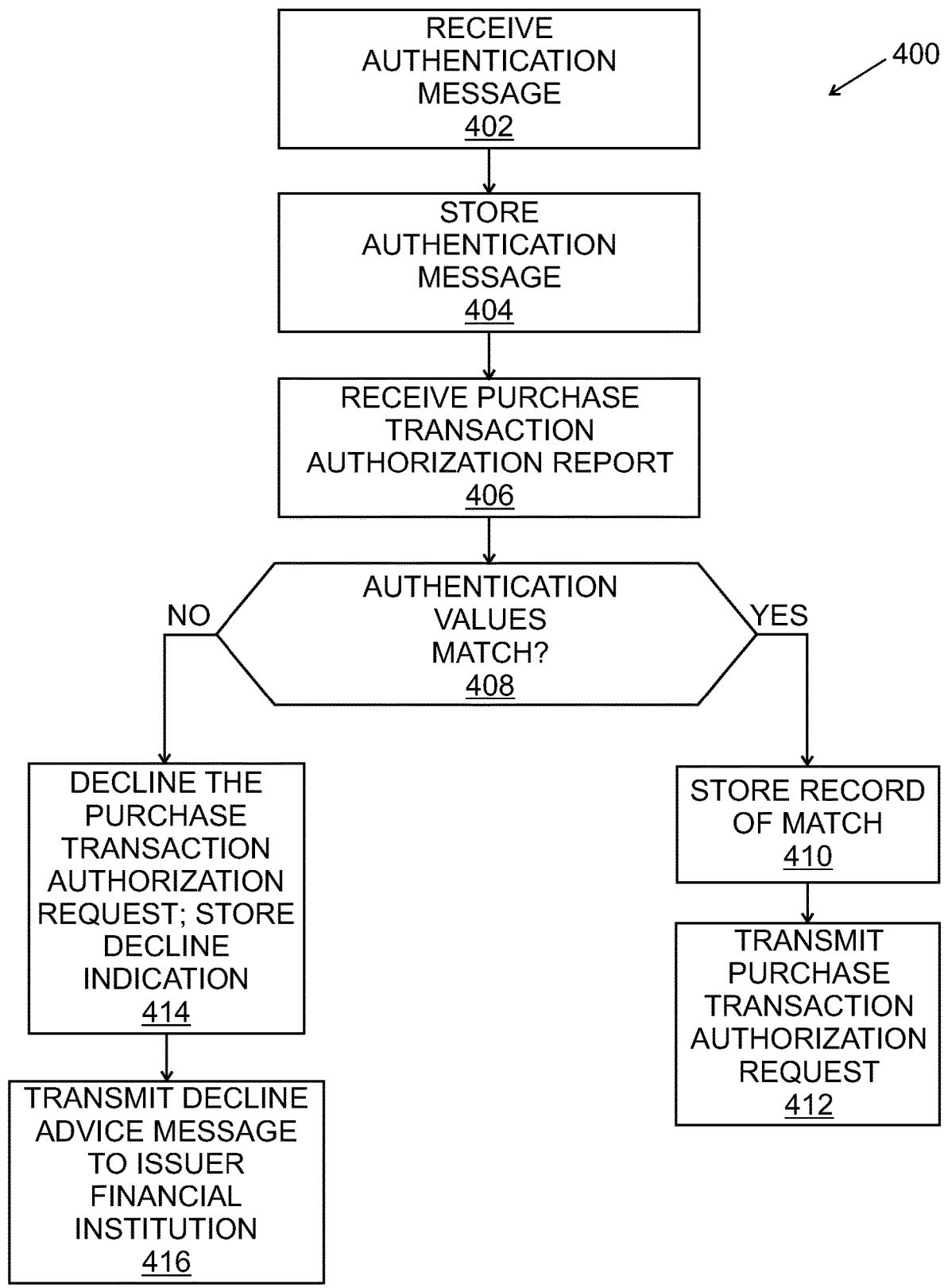
FIG. 4 is a flowchart of an online cardholder authentication services on-behalf-of (OBO) issuer financial institutions (FIs) process according to some embodiments of the disclosure.

FIG. 4 is a flowchart 400 of an online cardholder authentication services on-behalf-of (OBO) issuer financial institutions (FIs) process according to some embodiments of the disclosure. An on-behalf-of (OBO) issuer service computer receives 402 an authentication message from either of a merchant server computer or an access control server (ACS) computer, wherein the authentication message includes an authentication value and transaction data. The OBO issuer service computer stores 404 the authentication message in a transaction database, and next receives 406 a purchase transaction authorization request message from a payment network. In some implementations, the OBO issuer service computer recognizes that OBO issuer service processing should occur, and thus determines 408 whether or not an authentication value in an universal cardholder authentication field (UCAF) of the purchase transaction authorization request message matches the authentication value of the stored authentication massage. When a data match occurs, the OBO issuer service computer stores 410 a record of the match in the transaction database, and then transmits 412 the purchase transaction authorization request to the payment network for purchase authorization processing. The payment network then contacts the appropriate issuer financial institution as explained herein, in order to determine whether or not to authorize the purchase transaction depending on, for example, the credit worthiness of the cardholder.

Referring again to FIG. 4, if in step 408 the OBO issuer service computer determines that there is a mismatch between the authentication value in the universal cardholder authentication field (UCAF) of the purchase transaction authorization request message and the authentication value of the stored authentication massage, then the OBO issuer service computer declines 414 the purchase transaction authorization request and stores a decline indication in a transaction database. In some implementations, the OBO issuer service computer may send a decline purchase transaction message to the merchant (for example, to the merchant server computer 204) via the merchant's acquirer FI computer, which received it via a payment network. The 3-D Secure OBO issuer service computer may also transmit 416 a decline advice message to an issuer financial institution (FI) computer via a payment network to notify the cardholder's issuer FI of the declined purchase transaction authorization request.

Figure 5:
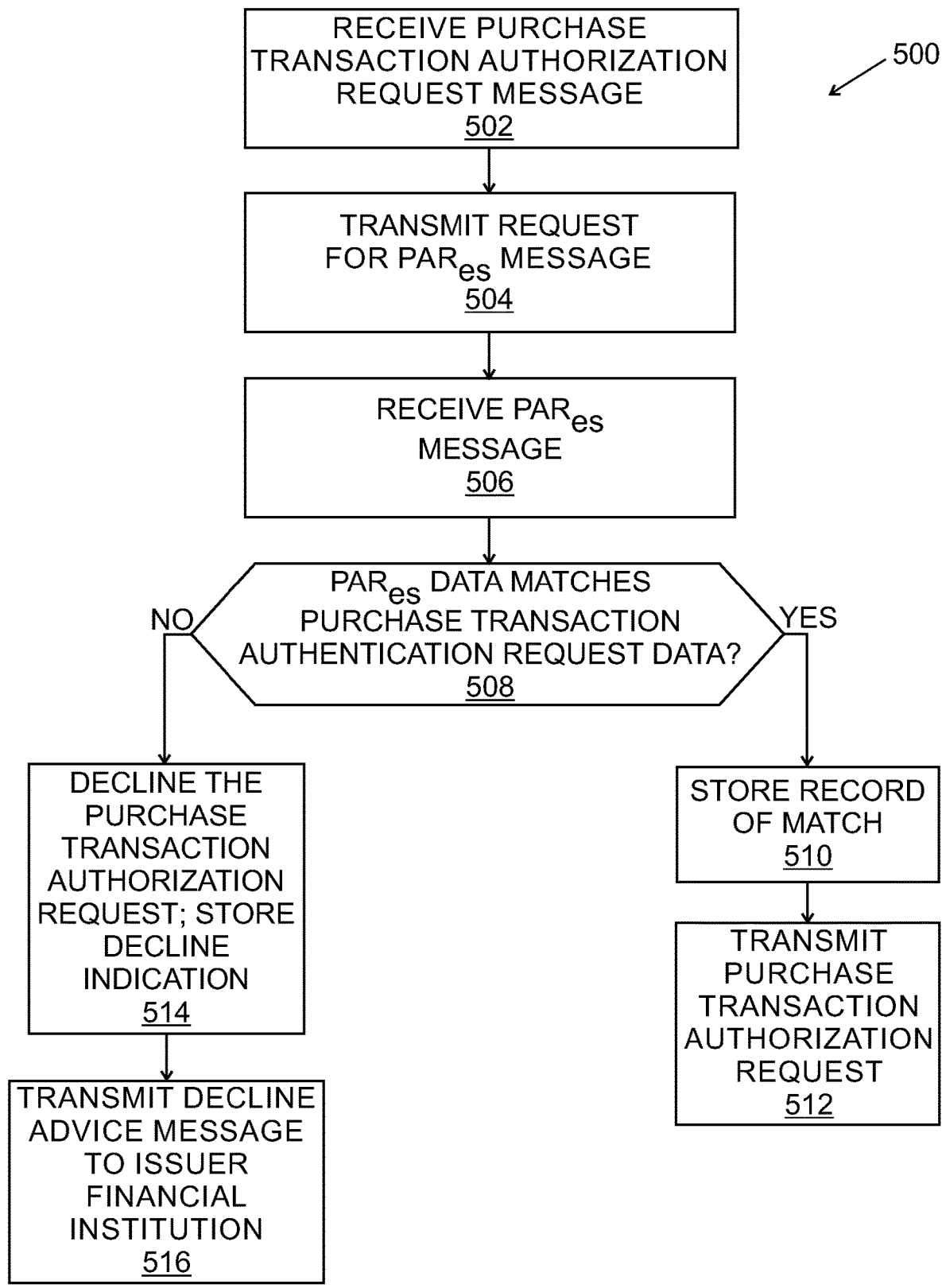
FIG. 5 is a flowchart of an online cardholder authentication services on-behalf-of (OBO) issuer financial institutions (FIs) process according to some further embodiments of the disclosure.

FIG. 5 is a flowchart 500 of an online cardholder authentication services on-behalf-of (OBO) issuer financial institutions (FIs) process according to some further embodiments of the disclosure. The on-behalf-of (OBO) issuer service computer receives 502 a purchase transaction authorization request message from a payment network, and recognizes that OBO issuer service processing should occur. Thus, the OBO issuer service computer transmits 504 a request for a Payer Authentication Response (PARes) message to a directory service server computer, wherein the requested PARes message is associated with the purchase transaction that is the subject of the purchase transaction authorization request message. When the directory service server computer is successful in locating the requested PARes message (which would typically be stored in a memory), the OBO issuer service computer receives 506 the PARes message from the directory service server computer. The OBO issuer service computer then compares 508 data of the received PARes message with data of the purchase transaction authorization request message, and when a match occurs then stores 510 a record of the match in a transaction database. The OBO issuer service computer then transmits 512 the purchase transaction authorization request to the payment network for purchase transaction authorization processing. The payment network then contacts the appropriate issuer financial institution as explained herein, in order to determine whether or not to authorize the purchase transaction depending on, for example, the credit worthiness of the cardholder.

Referring again to FIG. 5, if in step 508 the OBO issuer service computer determines that a mismatch occurred between data of the PARes message and data of the purchase transaction authorization request message, then the OBO issuer service computer declines 514 the purchase transaction authorization request and stores a response code in a storage device that corresponds to a decline outcome for the purchase transaction authorization request message. In some implementations, the OBO issuer service computer may transmit a decline purchase transaction message directly to a merchant server computer, or to a merchant financial institution computer via the payment network. The OBO issuer service computer also transmits 516 a decline advice message to an issuer financial institution (FI) computer, via the payment network, to notify the cardholder's issuer FI of the declined purchase transaction authorization request.

With regard to any processes or flowcharts provided herein, it should be understood that the process steps and/or illustrated methods are not limited to the order disclosed and/or shown. Rather, embodiments of the methods may be performed in any order that is practicable. Moreover, some embodiments may employ one or more portions of the methods illustrated herein without one or more other portions of the methods.

As used herein and in the appended claims, the term "payment card account" includes a credit card account or a deposit account that the account holder may access using a debit card. The term "payment card account number" or "financial account number" includes a number that identifies a payment card account or a number carried by a payment card, or a number that is used to identify an account in a payment system that handles debit card and/or credit card transactions or to route a transaction in a payment system that handles debit card and/or credit card transactions. The term "payment card" includes a credit card or a debit card (including a pre-paid debit card). The term "payment card account" also includes an account to which a payment card account number is assigned. Thus a payment card account may include an account to which payment transactions may be routed by a payment system that handles debit card and/or credit card transactions, even if the account in question is not eligible to be charged for purchase transactions or other transactions. A payment card account may also include an account from which payment transactions may be routed by a payment system that handles debit card and/or credit card transactions, even if the account in question is not customarily used, or is not eligible, to be charged for purchase transactions.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for providing online cardholder authentication services on-behalf-of issuer financial institutions, comprising:
   receiving, by an on-behalf-of (OBO) issuer service computer from one of a merchant server computer or an access control server (ACS) computer, an authentication message comprising an authentication value and transaction data;
   storing, by the OBO issuer service computer, the authentication message in a transaction database;
   receiving, by the OBO issuer service computer from a payment network, a purchase transaction authorization request message;
   determining, by the OBO issuer service computer, that an authentication value in an universal cardholder authentication field (UCAF) of the purchase transaction authorization request message matches the authentication value of the stored authentication message;
   calculating, by the OBO issuer service computer, a time difference value between a time and date of an online purchase transaction stored in the transaction database and a time and date of the purchase transaction authorization request message;
   determining, by the OBO issuer service computer, that the time difference value is within a predetermined time range thus approving the purchase transaction authorization request;
   storing, by the OBO issuer service computer in the transaction database, a record of the match; and
   transmitting, by the OBO issuer service computer, the purchase transaction authorization request to the payment network for purchase authorization processing.

2. The method of claim 1, wherein the authentication message comprises a positive Payer Authentication Response (PARes) message.

3. The method of claim 1, wherein the authentication message comprises fields comprising at least two of a cardholder's Primary Account Number (PAN), an acquirer identifier, a merchant identifier, the date and time of the online purchase transaction, a transaction amount, the UCAF, and a transaction identifier.

4. The method of claim 1, wherein the authentication value is in the UCAF.

5. The method of claim 1, further comprising, subsequent to calculating the time difference value:
   determining, by the OBO issuer service computer, that the time difference value falls outside the predetermined time range; and
   declining, by the OBO issuer service computer, the purchase transaction authorization request.

6. The method of claim 5, further comprising:
   storing, by the OBO issuer service computer in the transaction database, a response code that corresponds to a decline outcome for the purchase transaction authorization request message; and
   transmitting, by the OBO issuer service computer, a decline advice message to an issuer financial institution (FI) computer to notify a cardholder's issuer FI of the declined purchase transaction authorization request.

7. The method of claim 1, further comprising, subsequent to receiving the purchase transaction authorization request message:
   determining, by the OBO issuer service computer, that the authentication value in the UCAF of the purchase transaction authorization request message does not match the authentication value of the stored authentication message; and
   declining, by the OBO issuer service computer, the purchase transaction authorization request.

8. The method of claim 7, further comprising:
   storing, by the OBO issuer service computer in the transaction database, an indication of a decline outcome for the purchase transaction authorization request; and
   transmitting, by the OBO issuer service computer, a decline advice message to an issuer financial institution (FI) computer to notify a cardholder's issuer FI of the declined purchase transaction authorization request.

9. A system for providing online cardholder authentication services on-behalf-of issuer financial institutions, comprising:
   an on-behalf-of (OBO) issuer service computer comprising a storage device and an OBO issuer service processor;
   a merchant server computer operably connected to the OBO issuer service computer;
   an access control server (ACS) computer operably connected to the OBO issuer service computer; and
   a payment network operably connected to the OBO issuer service computer;
   wherein the storage device stores instructions configured to cause the OBO issuer service processor to:
      receive an authentication message comprising an authentication value and transaction data from one of the merchant server computer or the ACS computer;
      store the authentication message in the storage device;
      receive a purchase transaction authorization request message from the payment network;
      determine that an authentication value in an universal cardholder authentication field (UCAF) of the purchase transaction authorization request message matches the authentication value of the stored authentication message;

calculate a time difference value between a time and date of an online purchase transaction stored in the storage device and a time and date of the purchase transaction authorization request message;

determine that the time difference value is within a predetermined time range thus approving the purchase transaction authorization request;

store a record of the match in the storage device; and transmit the purchase transaction authorization request to the payment network for purchase authorization processing.

10. The system of claim 9, wherein the authentication message comprises a positive Payer Authentication Response (PARes) message.

11. The system of claim 9, wherein the authentication message comprises fields comprising at least two of a cardholder's Primary Account Number (PAN), an acquirer identifier, a merchant identifier, the date and time of the online purchase transaction, a transaction amount, the UCAF, and a transaction identifier.

12. The system of claim 9, wherein the authentication value is in the UCAF.

13. The system of claim 9, wherein the storage device stores further instructions, subsequent to the instructions for calculating the time difference value, configured to cause the OBO issuer service processor to:

determine that the time difference value falls outside the predetermined time range; and decline the purchase transaction authorization request.

14. The system of claim 13, wherein the storage device stores further instructions configured to cause the OBO issuer service processor to:

store a response code that corresponds to a decline outcome for the purchase transaction authorization request message in the storage device; and transmit a decline advice message to an issuer financial institution (FI) computer to notify a cardholder's issuer FI of the declined purchase transaction authorization request.

15. The system of claim 9, wherein the storage device stores further instructions, subsequent to the instructions for receiving the purchase transaction authorization request message from the payment network, configured to cause the OBO issuer service processor to:

determine that the authentication value in the UCAF of the purchase transaction authorization request message does not match the authentication value of the stored authentication message; and decline the purchase transaction authorization request.

16. The system of claim 15, wherein the storage device stores further instructions configured to cause the OBO issuer service processor to:

store an indication of a decline outcome in the storage device; and transmit a decline advice message to an issuer financial institution (FI) computer to notify a cardholder's issuer FI of the declined purchase transaction authorization request.

\* \* \* \* \*